Feb. 1, 1955 J. E. WOLFF ET AL 2,700,938
APPARATUS AND METHOD FOR TABLET PRODUCTION
Filed March 19, 1952 2 Sheets-Sheet 1

INVENTORS
John Edward Wolff
Paul W. Wilcox
BY
Pennie, Edmonds, Morton, Barrows and Taylor
ATTORNEYS

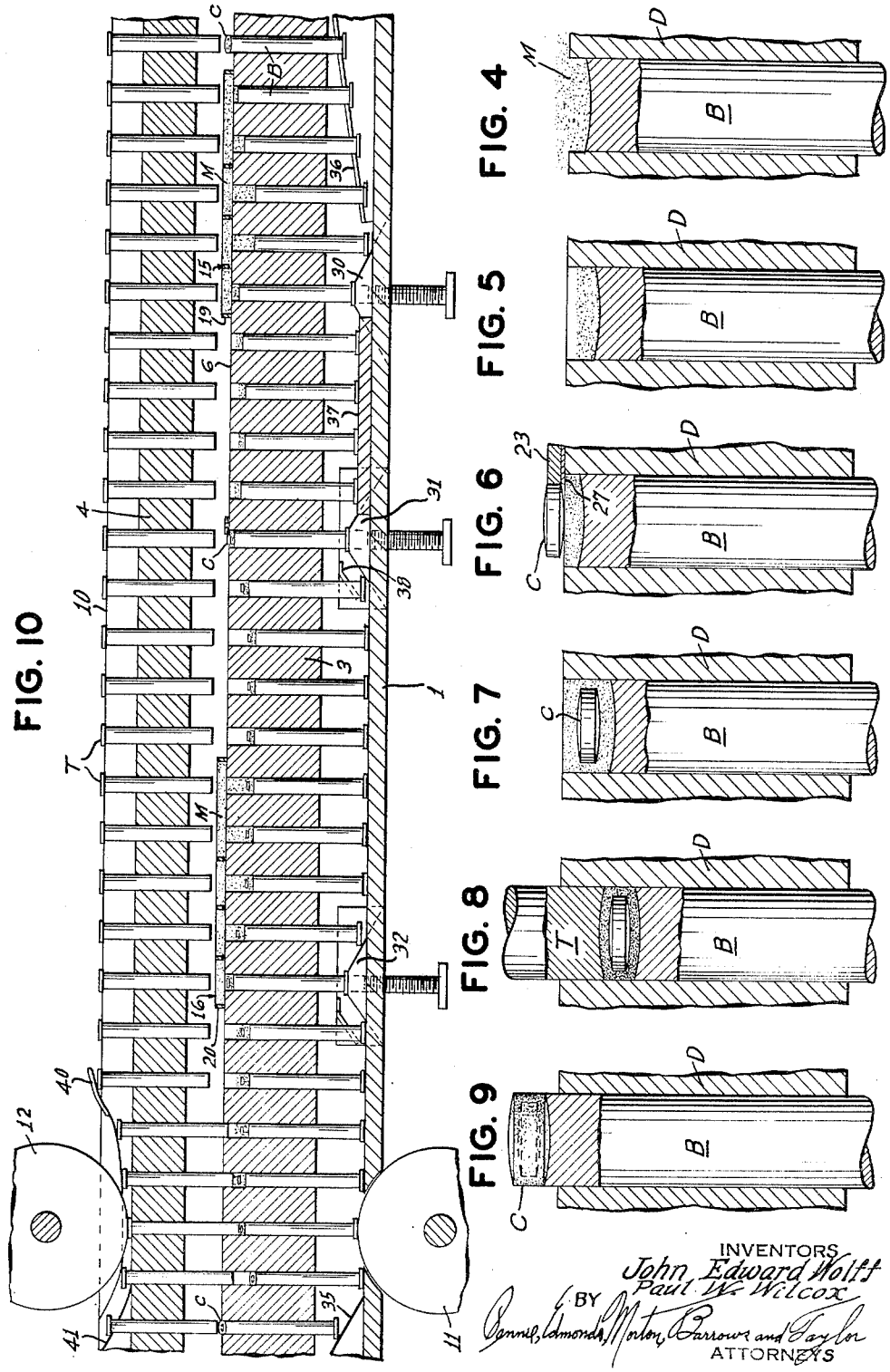

United States Patent Office 2,700,938
Patented Feb. 1, 1955

2,700,938

APPARATUS AND METHOD FOR TABLET PRODUCTION

John Edward Wolff, Lansdale, and Paul W. Wilcox, North Wales, Pa., assignors to Merck & Co., Inc., a corporation of New Jersey Application March 19, 1952, Serial No. 277,436

6 Claims. (Cl. 107—1)

This invention relates to tablet production, and has for its object the provision of an improved method and apparatus for the production of coated tablets. The invention is concerned with the mass production of compressed tablets and provides a method of compressing a firmly adhering coating or layer of granular material on a previously compressed tablet. Hereinafter, for convenience, we shall refer to "tablets," to include pellets and pills, the previously compressed tablet as the "core tablet," and the exterior applied covering of granular material, whether it be a coating to protect or disguise the inner or core tablet or an exterior covering of medicinal material, as a "coating."

Our invention provides a series of operative steps in which dies charged with granular coating material are moved successively through a transfer point, the core tablets and dies are moved continuously in the same general direction, and, when the dies and core tablets are coincident and moving in the same direction and at the same speed, the core tablets are deposited in the center of the dies on the granular coating material. Additional coating material is applied over the core tablets to cover them and the coating material is compressed into adhering contact with the core tablets.

A presently preferred and more complete operation of the invention comprises operating a series of dies with complementary top and bottom punches by lowering the bottom punch of each die to fill the space in the die with granular material, elevating the punch to remove excess material to retain in the die the required amount of material to coat the bottom of the core tablet, moving a core tablet and die in the same direction and with the same speed, and, when the core tablet is coincident with the center of the die, depositing the core tablet on the coating material in the center of the die, lowering the bottom punch together with the coating material and core tablet supported thereon to receive a top and side covering of the granular material, elevating the bottom punch to remove excess material to retain in the die an amount of material sufficient to coat the top of the tablet to the same amount as the bottom, and compressing the contents of the die sufficiently to form an adhering coating on the core tablet. The method of our invention may be carried out advantageously on a rotary tablet forming machine of our invention.

The apparatus of our invention comprises improvements in the widely used rotary tablet-forming presses having a rotary structure with a multiplicity of annularly disposed dies and complementary bottom and top punches operating in the dies, with cam means for the movement of the punches, means for feeding granular material into the dies, and means for driving the punches to final compression. Our invention provides improvements on such rotary presses residing primarily in the provision of separate feeding means, one to apply a lower layer of granular material in the die and the other to apply a top layer of the material over a deposited core tablet, and means for precisely depositing a core tablet on the bottom layer of material in each die. The apparatus of the invention also comprises cam means for operating the bottom punches which are constructed and arranged to effect a sequence of movements of the punches with respect to the movement of the rotary die bed and the means for depositing the core tablet in the center of the bottom-filled die to form a coating of uniform thickness over the core tablet. Our invention provides, in combination, a rotary tablet feeder, advantageously a feeder having individual receptacles or pockets for the core tablets arranged to travel in synchronism with the dies, the centers of the core tablets being moved in the same direction and with the same peripheral speed as the centers of the dies, and means for depositing each core tablet on the material in the precise center of each die during continuous movement of both.

The cam means are advantageously so constructed and arranged that they hold the bottom punches at a position with the upper surface of the material at almost the level of the die at the instant of deposition, and after deposition quickly lower the punches to draw the core tablet which was just deposited away from the depositing means, whereby the tablet is deposited in a flat position in the center of the die on the loose granular material in the die without disturbing it, and all in a continuous operation.

These and other objects of the invention will be better understood after considering the following discussion taken in conjunction with the accompanying drawings, in which:

Figs. 4 to 9 are enlarged fragmentary sectional views taken at 4—4, 5—5, 6—6, 7—7, 8—8, and 9—9 of Fig. 1, and Fig. 10 is a vertical rectilinear development of the rotary bed, stationary head, plungers and cams through the centers of dies of Fig. 1.

Figure 1:
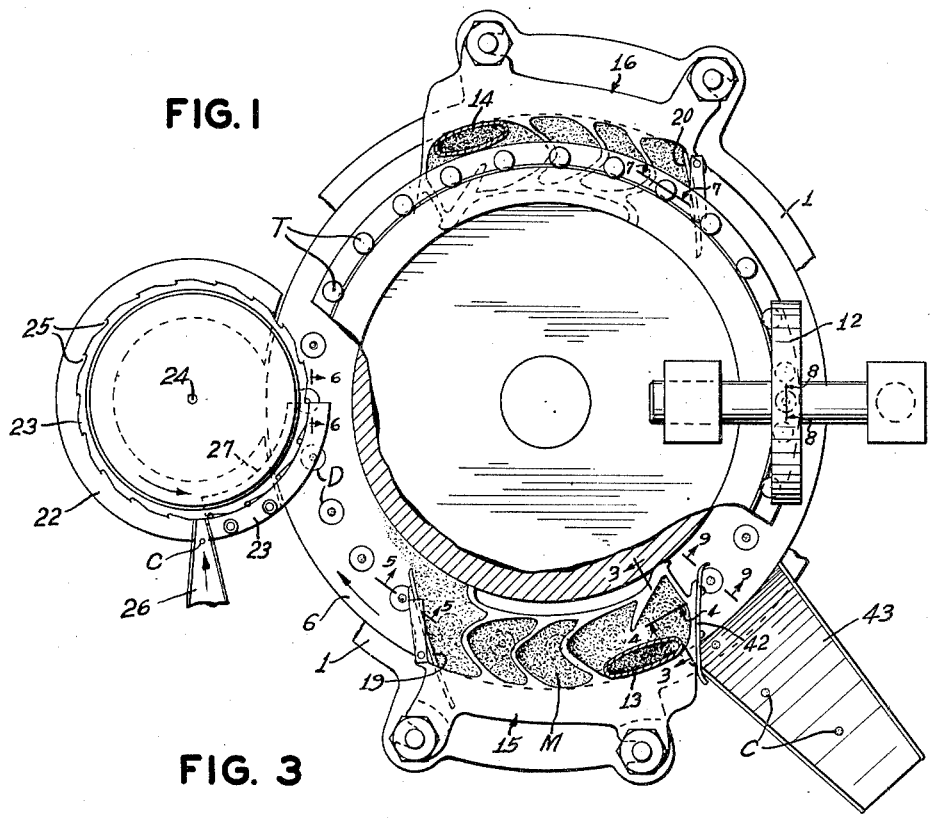
Fig. 1 is a plan view, with parts omitted, of a rotary tablet-forming machine embodying the invention.
Figure 3:
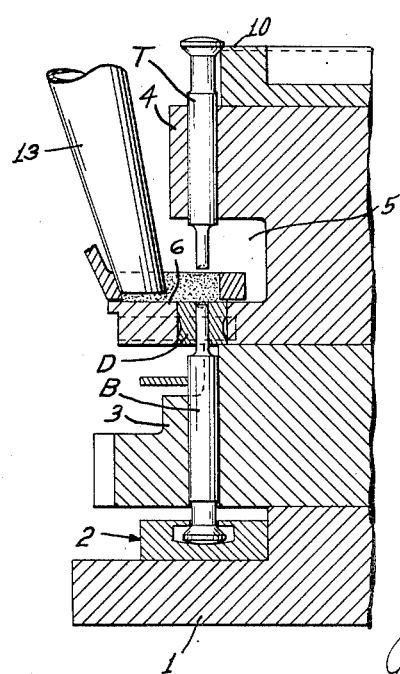
Fig. 3 is a sectional view on an enlarged scale at 3—3 of Fig. 1.

The drawings illustrate an improved rotary tablet-forming press with many of the non-essential commonly known elements omitted. This press comprises a stationary base 1 on which is securely mounted the annular cam means 2. The rotary part of the press comprises a lower driven punch block 3 which is fixedly connected to the upper punch block 4 and both members rotate in unison. The upper punch block has an annular groove 5 and a flat and horizontally disposed filling surface or die bed 6. The die bed 6 has 27 tablet forming dies D and punches annularly arranged and with their axes coincident with top punch T and bottom punches B. Other numbers of dies may be used such as 16 or 33. The bottom punches B operate in bearing bores in the punch block 3 and have integral headed lower ends in operating connection with cam means 2. The flat die bed 6 is provided with dies D in which the bottom punches operate, the upper surface of which are flush with the surface 6. The top punches T are operatively mounted in bearing bores in the upper punch block 4, each punch of which has a flared head which engages the upper stationary cam means 10. Both the base 1, cam means 2 and cam means 10 are connected to the stationary part of the press. The press is provided with adjustable lower compression roller 11 and an upper fixed compression roller 12, these rollers cooperating to drive the bottom and top punches in the final compression of the tablet.

The common type of rotary press just described also includes diametrically opposite feed hoppers 13 and 14 for filling the dies with a granular tablet forming material. In our invention the feed hopper 13 and feed frame 15 are used to place in the dies what we shall refer to as the "bottom fill" while the identical and diametrically disposed feed hopper 14 and feed frame 16 are used to add to the dies an additional quantity of the same material which we shall refer to as the "top fill." These leveling devices comprise scraper blades 19 and 20 in close contact with the die bed 6 for scraping excess material which would otherwise project above the flat top surfaces of the dies.

The standard press is designed for the production of two different groups of tablets, one on each half of the machine. The feeder 13 feeds the granular material for tablets that are completely formed and discharged before the rotating dies reach the feeder 14. The feeder 14 feeds granular material to form another set of tablets which are completely formed and discharged before the dies reach the feeder 13.

In accordance with our invention, we provide a tablet feed wheel or disc mechanism 21 (Fig. 1), a peripheral portion of which is superposed over the flat bed 6. This feed wheel mechanism is described more fully and claimed in the application of John Edward Wolff, Paul W. Wilcox, William Kirk Wyatt, Jr., Serial No. 224,608, filed May 4, 1951. Briefly, this mechanism comprises a stationary annular base 22 over which is mounted the feed wheel 23 which is rotatably mounted on the drive shaft 24 and driven in synchronism with members 3 and 4, preferably through a gear system not shown. The peripheral portion of the feed wheel has a multiplicity of spaced pockets 25 which are shaped to effect a close fit with the previously formed annular core tablets C fed into the pockets one at a time through any suitable feed means 26. A suitable means for this purpose is described in the application of William Kirk Wyatt, Jr., Serial No. 210,840, filed February 14, 1951, Patent 2,634,022. The feed wheel is so proportioned and spaced with respect to the dies that the centers of the tablets in the pockets coincide with the centers of the dies and both travel in the same direction and at the same speed when their respective centers coincide. The points of coincidence embrace a line through the centers of the two rotatable members and this is what we refer to as the "transfer point." In order to support the tablets out of contact with the rotating die bed 6 of the press, a thin arcuate metal plate 27, as partly shown in Fig. 2, is attached to the permanent base 22. This plate is adjustable so that the extreme edge 28 thereof can be located exactly in the proper place with respect to the location of the die and the tablet in a pocket at the time the tablet is deposited in the die (Fig. 2).

Figure 2:
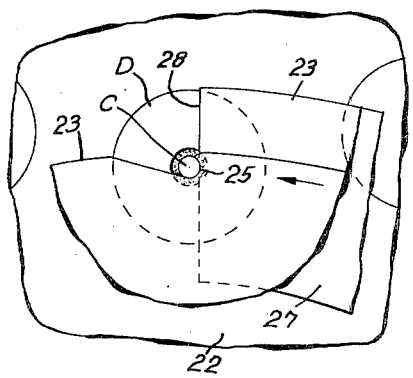
Fig. 2 is a fragmentary enlarged plan view where the core tablet is deposited in one of the dies.

Fig. 10 is a rectilinear development of the cam means, punch blocks, dies, and punches of the press of Fig. 1. The cam means 2 has three adjustable cam insets 30, 31 and 32, to vary the thickness of the coating material, to control the position of the bottom fill prior to deposition of the core tablet, and to regulate the thickness of the top fill as will be described hereinafter, fixed abrupt cam 35, and cam rails 36, 37, 38 and 39. It will be noted that all of the top punches are held by their heads on the cam 10 in an upward out-of-the-way position until they reach the cam rail 40 which starts them in the downward direction so that they are brought under the compression roller 12 for final compression. Thereafter, they are guided upward in the cam track 41 to their upper suspended position on cam 10.

The bottom punch B on the extreme right is shown in its most elevated position supporting a coated tablet C which is removed by contacting a deflecting baffle (not shown). As the rotating structure comprising members 3 and 4 and their punches travel toward the left, the bottom punches are moved progressively downward under the cam rail 36 as they pass under the feeder 13 and feed frame 15 to fill the space in the die with the granular coating material M. At the lowermost position the dies engage the adjustable cam section 30 and are raised to remove excess material which is scraped off flush by means of scraper 19. Thereafter, the punches drop down under their own weight and engage the cam 37 to lower the upper surface of the material in the die. Continuing from this position the punches engage the adjustable cam 31 and are raised to bring the upper surface of the material in the die to the level of the surface of the bed. At this point a preformed core tablet C supported on the plate 27 and in a pocket 25 of the feed wheel 23 is placed onto the upper surface of the bottom fill in the precise center of the die. At the time of deposition, the center of the die and the center of the core tablet are traveling in the same direction and at the same speed. The cam rail 38 is shaped to effect a rapid withdrawal of the bottom punch to bring the deposited tablet out of contact with the wheel 23 and also to provide space in the die for receiving the top fill of granular material. As the rotating structure with the dies travels toward the left, it passes under the feed means 14 and the dies are loaded with the top fill. The dies move into contact with the adjustable cam segment 32 and are quickly elevated while under the scraper 20 which removes all of the excess material. Continuing, the punches engage the cam rail 39 which moves them downward and as they travel in this position along the cam 2 they come into gradual contact with the lower adjustable press roller 11. At the same time, the top punches T pass under the cam rail 40 and are positioned to pass under the top press roller 12 and the coating material, both top and bottom, is compressed under a predetermined pressure sufficiently great to effect a strong adherent bonding of the coating material to the preformed core tablet. The bottom punches B then engage the cam surface 35 and are elevated while the top punches T engage the cam track 41 and are also elevated. This elevation of the punches removes the top punch from contact with the coated tablet C and further elevates the bottom punch to the position shown at the right which is above the flat surface of the die bed 6. As the rotating structure continues in the direction of the arrow, the coated tablet strikes the deflecting baffle 42 and is guided into the chute 43.

Figs. 4 to 9 are fragmentary sectional enlargements of the die area showing the positions of the punches at various important stages in the deposition of the coating material and the location of the core tablet in its precisely centered position with respect to the die. Fig. 4 shows the initial loading of the die with bottom fill M. Fig. 5 shows the measured quantity of bottom fill in the die, and Fig. 6 the elevation of this fill to a position even with the upper surface of the bed at the time the core tablet is deposited. Fig. 7 shows the bottom punch withdrawn and the die cavity filled with a measured quantity of top fill and ready for final compression, as illustrated at Fig. 8 which is the position between the compression rollers 11 and 12 of Fig. 10. Fig. 9 shows the position of the bottom punch in its highest elevated position for the removal of the finished coated tablet C.

In carrying out a method of our invention in the arrangement of apparatus illustrated in the drawings, the preformed tablet is usually formed of a granular material and is preferably compressed to an amount which permits a further degree of compression in this coating operation between the press rollers 11 and 12 to an amount preferably around 8% to 16% in thickness. We prefer to use such granular materials and to effect such a degree of compression as is described in the copending application of John Edward Wolff, Serial No. 275,688, filed March 8, 1952. We may use core tablet materials or coating materials of any suitable composition, advantageously granular core tablet and coating formulations as described in said application. The following formulation is a typical one suitable for many coating purposes:

*Granular sugar coating formulation*

| | | |
|---|---|---|
| Powdered sugar | gm | 470 |
| Lactose | gm | 470 |
| Acacia powdered | gm | 20 |
| Corn starch | gm | 60 |
| Gelatin solution | cc | 60 |
| D & C Red No. 19 (1–300 solution) | cc | 2 |

The granular coating formulation is prepared by mixing the first four powders together and passing them through a fine screen. The hydro-alcoholic dye solution is incorporated in the mixture which is again passed through a fine screen. The mixture is granulated with the gelatin solution and the dampened material is passed through a 10-mesh screen. The granules are dried at 55° C., reduced in size, and passed through a 30-mesh screen. Just prior to feeding the coating material to the press, one part of the magnesium stearate is incorporated in 200 parts of the granular material.

In carrying out a coating operation, the rotatable structure is rotated at any desired speed, for example about 18 R. P. M. The feeder 13 is kept filled with the granular formulation and the bottom fill is placed in the dies, the excess material being removed by the scraper 20 to obtain the measured quantity of material illustrated in Fig. 5. Thereafter, the material supported on the bottom punch B is elevated and set at the level shown in Fig. 6. The entire rotatable structure of the press and feed wheel 23 rotate continuously in the direction of the arrows, Fig. 1. As the empty pockets of the feed wheel 23 reach the feed chute 26, a preformed core tablet drops into the pocket 25 and is carried along over the support plate 27 to the position shown in Figs. 1, 2 and 6. The tablet is deposited onto the upper surface of bottom fill in the precise center of the die. Thereafter, a measured quantity of the same granular formulation from feeder 14 is deposited over the tablet in the die and when the die passes between the press rollers 11 and 12 the coating material is compressed to final hardness. In using such a pressure that the core tablet is compressed to reduce its thickness in an amount varying, say, from 8% to 16%, there is such an intermingling of the materials of the core tablet and the coating formulation at the interface that a firm adherent coating is formed on the tablet.

We claim:
1. The method of coating core tablets in an apparatus having a multiplicity of identical dies, a punch in the bottom of each die and a punch which enters the top of each die, which comprises filling the dies successively with a granular coating material and, while the dies are moving in rapid succession through a transfer point, moving a core tablet of materially smaller diameter than the dies and a die in the same direction and speed and, when the center of the tablet is coincident with the center of the die and while continuing the movement of the die and core tablet depositing the tablet on the surface of the granular material while it is flush with the upper surface of the die, lowering the bottom punch together with the material and deposited tablet supported thereon, filling the resulting space in the die with a quantity of the granular material to cover the sides and top of the core tablet, and compressing the material in the die between the punches under a pressure which effects a firm coating on the entire tablet, whereby an improved tablet is produced having a core tablet with a coating of uniform thickness.

2. In the method of claim 1, after the initial filling of the die, elevating the bottom punch to push some of the material initially deposited in the die out of the die, removing this excess material to retain a carefully measured amount in the die, and then depositing the tablet on the surface of the material at approximately the top surface of the die.

3. In the method of claim 1, lowering the bottom punch immediately after depositing the tablet on the material to retain it in its deposited position.

4. The improvement in tablet forming apparatus of the type having a rotatable die bed with a multiplicity of annularly disposed dies, a bottom punch in each die, cam means for operating the bottom punches, an upper member which moves in unison with the die bed having top complementary punches mounted to enter the dies and compress material therein, the improvement which comprises means for feeding coating material into the bottom of each die while the dies are continuously rotating, means for measuring the material in each die and leveling it at the approximate upper surface of the die, means for moving a succession of preformed core tablets to a position with the center of each core tablet coincident with the center of a die at the same speed and direction as the die at the time of coincidence and depositing it on the surface of the material when flush with the upper surface of the die without interrupting the movement of the die or core tablet, means for depositing in the die over the core tablet an amount of coating material sufficient to coat the sides and top of the core tablet, means for compressing the material over the tablet to form a coating of uniform thickness, and means for removing the coated tablets from the machine.

5. In the apparatus of claim 4, the means for feeding the tablets comprising a rotatable member having annularly disposed separate tablet receiving pockets in a position overlying an edge portion of the die bed and rotatable at such a speed that the centers of the tablets travel at the same speed as the centers of the dies, and means for sliding each core tablet from the feed means to a position over the top of the material in the die when the tablet and die are coincident.

6. The apparatus of claim 4 which comprises cam means for moving the bottom punches downward immediately after the tablet has been deposited to draw the material and tablet below the upper surface of the die and out of contact with the feed member.

References Cited in the file of this patent

UNITED STATES PATENTS

| 582,794 | Noyes | May 18, 1897 |
| 641,706 | Kraemer | Jan. 23, 1900 |
| 1,248,571 | Stokes | Dec. 4, 1917 |
| 2,666,400 | Vogt | Jan. 19, 1954 |

FOREIGN PATENTS

| 475,093 | Germany | Apr. 17, 1929 |